US009925966B2

(12) United States Patent
Lopéz-Larequi et al.

(10) Patent No.: US 9,925,966 B2
(45) Date of Patent: Mar. 27, 2018

(54) BRAKE MASTER CYLINDER FOR A MOTOR VEHICLE BRAKE SYSTEM WITH PROFILED PRESSURE PISTON

(71) Applicant: Lucas Automotive GmbH, Koblenz (DE)

(72) Inventors: David Lopéz-Larequi, Koblenz (DE); Hans-Martin Giese, Polch (DE)

(73) Assignee: Lucas Automotive GmbH, Koblenz (DE)

( * ) Notice: Subject to any disclaimer, the term of this patent is extended or adjusted under 35 U.S.C. 154(b) by 420 days.

(21) Appl. No.: 14/415,004

(22) PCT Filed: Jul. 17, 2013

(86) PCT No.: PCT/EP2013/065054
§ 371 (c)(1),
(2) Date: Jan. 15, 2015

(87) PCT Pub. No.: WO2014/012959
PCT Pub. Date: Jan. 23, 2014

(65) Prior Publication Data
US 2015/0175142 A1 Jun. 25, 2015

(30) Foreign Application Priority Data

Jul. 19, 2012 (DE) .................. 10 2012 014 321

(51) Int. Cl.
| | | |
|---|---|---|
| *F15B 15/14* | (2006.01) | |
| *B60T 13/14* | (2006.01) | |
| *B60T 11/224* | (2006.01) | |
| *B60T 11/236* | (2006.01) | |
| *B60T 11/28* | (2006.01) | |

(52) U.S. Cl.
CPC ........... *B60T 13/142* (2013.01); *B60T 11/224* (2013.01); *B60T 11/236* (2013.01); *B60T 11/28* (2013.01); *F15B 15/149* (2013.01)

(58) Field of Classification Search
CPC ...... B60T 11/224; B60T 11/236; B60T 11/28; B60T 13/142; F15B 15/1428; F15B 15/149; F15B 21/044; F16F 9/346; F16F 9/3465
(Continued)

(56) References Cited

U.S. PATENT DOCUMENTS 8,156,740 B2 * 4/2012 Bernadat ............... B60T 11/232
60/588
8,209,978 B2 * 7/2012 Nen ....................... B60T 11/232
60/588
(Continued)

FOREIGN PATENT DOCUMENTS

| DE | 19946415 A1 | 4/2000 |
|---|---|---|
| DE | 10325321 A1 | 2/2005 |

(Continued)

OTHER PUBLICATIONS

PCT International Search Report and Written Opinion, Application No. PCT/EP2013/065054 dated Mar. 18, 2014.
(Continued)

*Primary Examiner* — Logan Kraft
(74) *Attorney, Agent, or Firm* — MacMillan, Sobanski & Todd, LLC

(57) ABSTRACT

A brake master cylinder arrangement includes a housing with a cylindrical recess, a pressure piston moveable in the cylindrical recess along a longitudinal axis and guided in a sealing manner, and a reservoir for storing brake fluid that is fluidically connected via a fluid channel to the housing. The pressure piston and the housing enclose a pressure chamber that is connected to a fluid circuit of the brake system. Depending on the position of the associated pressure piston, the pressure chamber is either fluidically connected to the fluid reservoir or disconnected therefrom. In a region that axially spans the sealing arrangement in a starting position of the pressure piston, the outer circumferential surface of
(Continued)

the pressure piston has profiling that provides a fluidic connection between the fluid reservoir and the pressure chamber.

10 Claims, 5 Drawing Sheets

(58) Field of Classification Search
USPC .......................................................... 60/588
See application file for complete search history.

(56) References Cited

U.S. PATENT DOCUMENTS

| | | | |
|---|---|---|---|
| 8,276,994 B2* | 10/2012 | Lee | F16J 15/56 188/358 |
| 8,646,268 B2* | 2/2014 | Kim | B60T 11/236 60/562 |
| 2003/0213240 A1 | 11/2003 | Nix et al. | |

FOREIGN PATENT DOCUMENTS

| | | |
|---|---|---|
| DE | 102009037929 A1 | 4/2010 |
| DE | 102009014617 A1 | 9/2010 |
| EP | 2039574 A1 | 3/2009 |
| EP | 2058191 A1 | 5/2009 |
| WO | 03097422 A2 | 11/2003 |
| WO | 2011006305 A1 | 1/2011 |

OTHER PUBLICATIONS

PCT International Preliminary Report of Patentability, Application No. PCT/EP2013/065054, dated Mar. 11, 2014.

* cited by examiner

BRAKE MASTER CYLINDER FOR A MOTOR VEHICLE BRAKE SYSTEM WITH PROFILED PRESSURE PISTON

The present invention relates to a brake master cylinder arrangement for a motor vehicle brake system with a profiled pressure piston, comprising:
- a brake master cylinder housing having a cylindrical recess,
- at least one pressure piston which is movably and sealingly guided in the cylindrical recess in the brake master cylinder housing along a longitudinal axis,
- a fluid reservoir for storing a brake fluid, the fluid reservoir being fluidically coupled to the main brake cylinder housing via a fluid channel, wherein the at least one pressure piston together with the main brake cylinder housing encloses a pressure chamber in a sealing manner, which pressure chamber is or can be fluidically coupled to a fluid circuit of the motor vehicle brake system, and, depending on the position of the associated pressure piston, is fluidically connected to the fluid reservoir or disconnected therefrom, and wherein a sealing arrangement enclosing the pressure piston is provided between the outer circumferential surface of the pressure piston and the cylindrical recess in the main brake cylinder housing.

Brake master cylinder arrangements of this type are known from the prior art, and are described in the document EP 2 039 574 A1, for example. In this prior art, the respective pressure pistons of the disclosed tandem pressure piston system are guided in sealing arrangements. The pressure pistons themselves have a plurality of radial boreholes, which in the starting position ensure that a fluidic connection is present between the fluid reservoir and the pressure chamber. As soon as the pressure pistons are moved upon brake activation, the outer circumferential surface of the respective pressure piston slides past the sealing arrangement to the pressure chamber. As soon as the sealing arrangement has completely passed the radial openings, this results in insulation between the fluid reservoir and the pressure chamber, and, beginning at this point in time at the latest, pressure build-up in the pressure chamber may take place so as to cause braking. In the prior art document cited above, it was recognized that delays in the pressure build-up may occur due to the configuration of the sealing arrangement and the interaction between the sealing arrangement and the outer circumferential surface of the respective pressure piston in conjunction with the radial openings thereof. For this reason, this prior art provides relatively complicated throttle elements in the area of the connection to the fluid reservoir, which involve considerable technical effort.

This prior art has another drawback. FIG. 8 shows the situation in the area of the sealing arrangement at the starting position, in an enlarged illustration. It is seen that a sealing arrangement 1 is situated in a recess 2 in a brake master cylinder housing 3. Area 4 is fluidically connected to the fluid reservoir, and area 5 is part of the pressure chamber. A pressure piston 6 which has a circumferential indentation 7 at its outer circumferential surface is guided in the brake master cylinder housing 3. In addition, the piston 6 is provided with radial openings 8. FIG. 8 shows the initial state prior to the start of a displacement upon brake activation. Brake fluid is able to flow from the fluid reservoir through the radial opening 8 in the pressure chamber, past the sealing arrangement 1, via area 4. It is apparent that in the starting position 8 shown, the sealing arrangement 1 already makes tight contact within the profiling 7. As soon as the piston 6 is moved in the direction of the arrow P upon brake activation, corresponding forces act on the sealing arrangement 1 and attempt to displace it within the recess 2 in the direction of the arrow P, under the action of friction. However, this displacement of the sealing arrangement 1 within the recess 2 results in a delayed pressure build-up, since the complete closing of the radial openings 8 is thus prolonged. In addition, the movement of the sealing arrangement 1 within the recess 2 results in leakage flow due to the fact that this movement is not completely controllable. Furthermore, an inherently provided throttling effect of the seal at the start of the displacement, in particular due to the radially inner sealing edge 9 situated at the right in FIG. 8, is reduced on account of the displacement of the sealing arrangement 1 within the recess 2.

The object of the present invention is to provide a brake master cylinder arrangement of the type described at the outset which addresses the above problems and provides reliable functioning with a simpler design.

This object is achieved by a brake master cylinder arrangement of the type described at the outset, in which it is provided that in an axial region that spans the sealing arrangement in the axial direction in a starting position of the pressure piston, the outer circumferential surface of the pressure piston is furnished with profiling which provides a fluidic connection between the fluid reservoir and the pressure chamber. Unlike the approach according to the prior art, the present invention provides for achieving the fluidic connection between the fluid reservoir and the pressure chamber via profiling that is provided on the outer circumferential surface of the pressure piston, so that brake fluid is able to flow through between the sealing arrangement and the piston. The requirement for radial openings in the pressure piston may thus be avoided. The above-described disadvantages, in particular the axial movement of the sealing arrangement and the associated delay in the pressure build-up within the pressure chamber, may be avoided by such profiling in the outer circumferential surface of the pressure piston. The fact that the profiling spans the sealing arrangement in the starting position of the pressure piston ensures a reliable fluidic connection between the fluid reservoir and the pressure chamber in the starting position.

The invention provides that the profiling has a radial recess in the outer circumferential surface of the pressure piston. However, it is likewise possible for the profiling to be provided only in partial areas of the outer circumferential surface of the pressure piston, in the form of slots, for example, or extending in the axial region, completely around the pressure piston in the peripheral direction. In particular for the latter alternative, the pressure piston may be manufactured in a comparatively simple manner, in that the profiling may be designed in the form of a recess or indentation extending around the pressure piston in the peripheral direction.

It is preferably provided that the profiling opens up the sealing arrangement in the starting position until the fluid reservoir is fluidically decoupled, so that the pressure piston does not contact the sealing arrangement. The situation may thus be avoided that the sealing arrangement is moved under the action of friction during a displacement of the pressure piston from a starting position into a brake-activated position. Friction forces between the pressure piston and the sealing arrangement do not arise until the sealing arrangement comes into contact with a surface area of the profiling that is situated near the outer circumferential surface of the pressure piston. However, at this point in time, i.e., upon the corresponding contact, the pressure chamber is already sealed off from the fluid reservoir, so that any further displacement of the pressure piston results in a substantial pressure build-up in the pressure chamber.

One refinement of the invention provides that the profiling is furnished with surface area sections which are situated at different radial levels with respect to the longitudinal axis. Due to the configuration of the profiling with various surface area sections which are situated at different radial levels, the rate of the pressure build-up within the pressure chamber may be influenced according to the displacement of the pressure piston. In particular, a throttle characteristic may thus be set by suitable shaping of the profiling, so that the flow of brake fluid between the pressure chamber and the fluid reservoir is throttled in a desired manner, and the rate of the pressure build-up in the pressure chamber over time may be set according to the displacement of the pressure piston from its starting position into a brake-activated position.

According to one preferred embodiment variant of the invention, in this regard it is provided that the profiling has a first surface area section and a second surface area section, the first surface area section being situated at a higher radial level with respect to the longitudinal axis than the second surface area section. Thus, for example, the first surface area section is that section which in the starting position is situated closer to the fluid reservoir, whereas the second surface area section is that section which in the starting position is situated closer to the pressure chamber. In addition, in this regard it may be provided that the first and the second surface area sections are connected to one another via a connecting area which is radially recessed with respect to the outer circumferential surface of the pressure piston, and situated at a higher radial level than the respective radially innermost point of the first surface area section and of the second surface area section. Viewed in the cross section containing the axis, the connecting area may be a rounded or pointed elevation which acts as a throttling point for the fluid flow. The radial level of the connecting area may be set with respect to the longitudinal axis, depending on the desired braking characteristic. For example, if the connecting area is configured in such a way that it leaves only a small gap open with respect to the sealing arrangement, the connecting area has a greater throttling effect for the fluid flow between the pressure chamber and the fluid reservoir than in the case in which the distance between the connecting area and the sealing arrangement is selected to be larger.

For calming the flow, it may also be provided according to the invention that the profiling has a design with a rounded contour, viewed in a cross section of the pressure piston containing the axis. In particular, it may be provided that the transition between the outer circumferential surface of the pressure piston and the profiling, and in particular the transition between the first surface area section and the second surface area section, have a rounded design. However, it is also possible for individual sections, for example the connecting area between the profiling and the outer circumferential surface, to have a design with a small rounding radius or a sharp edge in order to provide a clearly defined seal as soon as the sealing arrangement enters this transition region due to a brake-activated displacement of the pressure piston.

With regard to the configuration of the outer circumferential surface of the pressure piston, it may be provided in particular that the profiling is designed in such a way that it throttles the fluid flow between the pressure chamber and the fluid reservoir when the pressure piston moves from the starting position into a brake-activated position. It is preferably provided that in the starting position of the pressure piston, the profiling together with the sealing element forms a flow cross section whose cross-sectional area decreases with increasing displacement of the pressure piston from the neutral position into a brake-activated position.

It is possible that in individual situations, the gap between the sealing arrangement and the outer circumferential surface of the pressure piston, provided by the profiling, may not be sufficient for a required fluid flow for relieving pressure in the pressure chamber. This is the case in particular when the operation of a traction control system and of a brake activation are superimposed, resulting in a residual pressure in the brake system, although the pressure piston has already assumed a position which under normal conditions would result in a fluidic connection between the pressure chamber and the fluid reservoir. To remedy this problem and also to enable a fluidic connection in such situations, the invention provides that at least one axial indentation is provided in the sealing arrangement and/or in the area of the profiling of the pressure piston. In this regard, axial slots may be provided in the sealing arrangement. Alternatively, it is possible to provide the at least one axial indentation in the connecting area of the pressure piston. This axial indentation may also have a design in the form of one or multiple axial slots in the respective connecting area of the pressure piston. The at least one axial indentation thus assists with the reduction of pressure in the pressure chamber, even in the above-mentioned residual pressure situation.

Exemplary embodiments of the invention are explained below by way of example with reference to the appended figures, which show the following:

Figure 1:
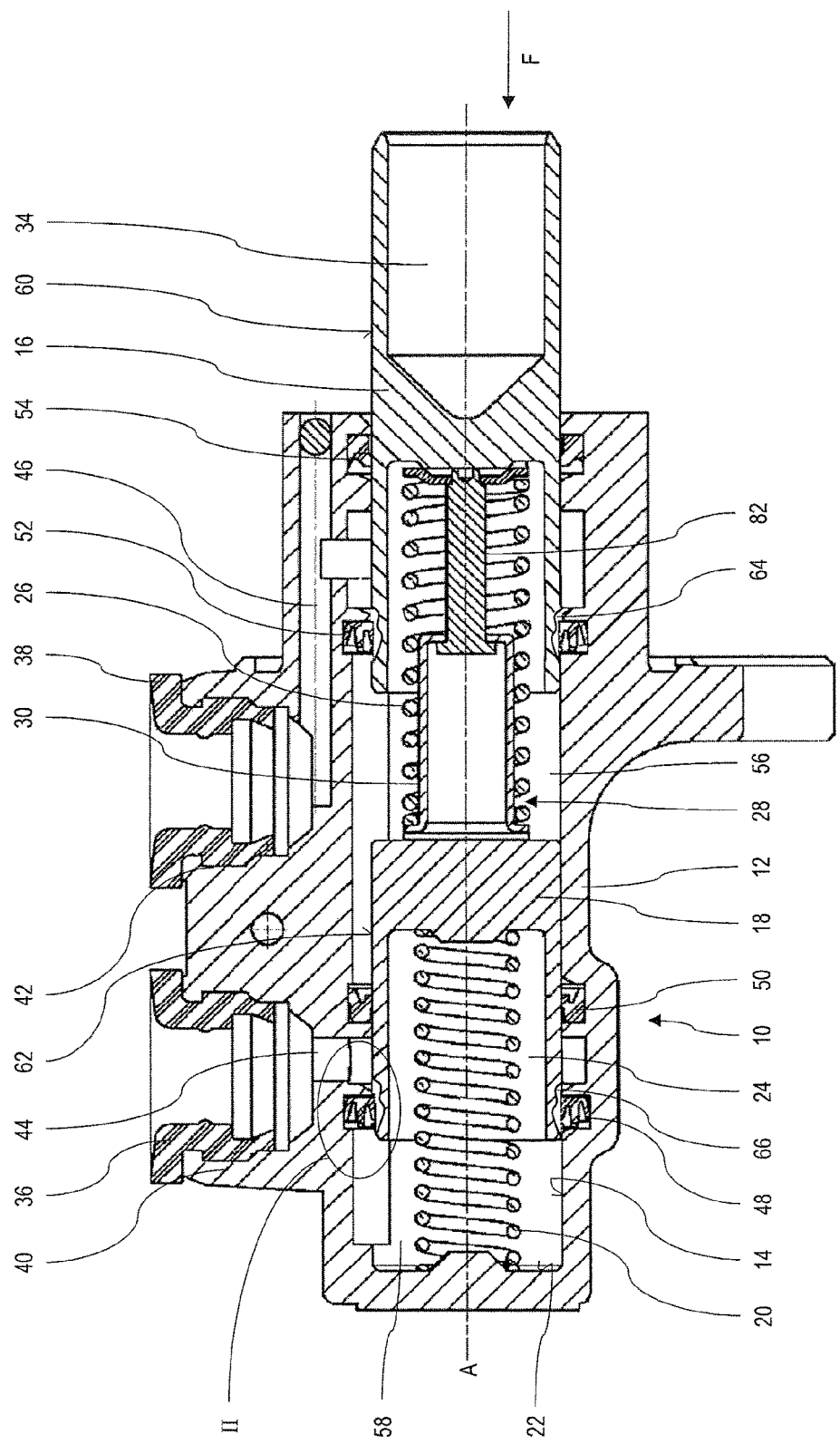
FIG. 1 shows an overview illustration of a brake master cylinder arrangement in a cross-sectional view containing the axis.

FIG. 1 shows a brake master cylinder arrangement according to the invention in a cross-sectional view containing the axis, and denoted in general by reference numeral 10. The brake master cylinder arrangement 10 has a brake master cylinder housing 12 in which an essentially cylindrical recess 14 is provided. Two pressure pistons are guided in this cylindrical recess 14, namely, a first pressure piston, the so-called primary piston 16, and a second pressure piston, the so-called secondary piston 18. The secondary piston 18 is supported on a base surface 22 of the brake master cylinder housing 12 via a restoring spring 20. The other end of the restoring spring 20 facing away from the base surface 22 is supported within a recess 24 in the secondary piston 18. Likewise, the primary piston 16 is supported on the secondary piston 18 via a restoring spring 26. The restoring spring 26 is pretensioned by a tensioning device 28 having a cup 30 and a plunger 32. The primary piston 16 has a primary piston receptacle 34 which protrudes into an actuating element (not shown) for the activation, such as a force output element of a brake booster or the like.

Also apparent in the brake master cylinder housing 12 are two sealing elements 36, 38 which are used for accommodating connectors of a fluid reservoir, not shown. The two sealing elements 36 and 38 are accommodated in receiving openings 40, 42, respectively, in the brake master cylinder housing 12. These receiving openings 40, 42 are connected via fluid channels 44, 46, respectively, to the cavity in the brake master cylinder housing 12 which is formed by the cylindrical recess 14. It is also apparent that in the interior of the brake master cylinder housing 12, two seals 48, 50 are accommodated on the primary piston 16, and two seals 52, 54 are accommodated on the secondary piston 18. These seals slide on the outer circumferential surface of the primary piston 16 and the secondary piston 18, and ensure that the primary piston 16 and the secondary piston 18 are sealingly guided in the brake master cylinder housing 12.

The two pressure pistons 16, 18 in each case close off a pressure chamber in the brake master cylinder housing 12. With regard to the primary piston 16, this is the primary pressure chamber 56. The secondary piston 18 closes off the secondary pressure chamber 58. In this example case shown, the two pressure pistons 16, 18, unlike the customary approach according to the prior art, are not provided with radial openings, but instead have profiling 64, 66, respectively, on their outer circumferential surfaces 60, 62, respectively, which in the initial state (unactuated position) shown in FIG. 1 permit a fluid flow between the pressure chambers 56, 58 and the fluid channels 44, 46 associated with same, to the respective fluid reservoirs or a shared fluid reservoir (not shown).

The following discussion, by way of example, refers to the area denoted by reference numeral II in order to describe the interaction between the sealing arrangement 48 situated there and the correspondingly profiled secondary piston 18. Corresponding statements similarly apply to the primary piston 16 and its interaction with the seal 52. However, it is noted that a combination of various pressure pistons is also possible according to the invention, i.e., a combination of a correspondingly profiled pressure piston and a further pressure piston provided with radial openings.

Upon an actuation for achieving a braking effect, the primary piston 16 is acted on by a force F, and is thus moved to the left in FIG. 1 along the longitudinal axis A by brake activation. Similarly, the secondary piston 18 is also moved to the left by means of the restoring spring 26. The aim is thus to build up a fluid pressure in the pressure chambers 56 and 58 which then results in a braking effect in a fluid circuit of the motor vehicle brake system (not shown), which is fluidically coupled to the two pressure chambers 56, 58.

However, it has been shown that at the start of such an actuation, the pressure build-up in the two fluid chambers 56 and 58 is delayed in conventional approaches, due to the fact that as the result of pressure, the brake fluid is able to flow back into the pressure-free fluid reservoir via a fluidic connection between the pressure chamber and the fluid reservoir. In such approaches from the prior art, sufficient pressure build-up in the pressure chambers 56, 58 does not occur until the fluidic connection is completely or virtually completely covered by the seals, so that such fluid flow is no longer possible. However, such a delayed pressure build-up is undesirable. The invention addresses this problem, as explained in greater detail below.

Figure 2:
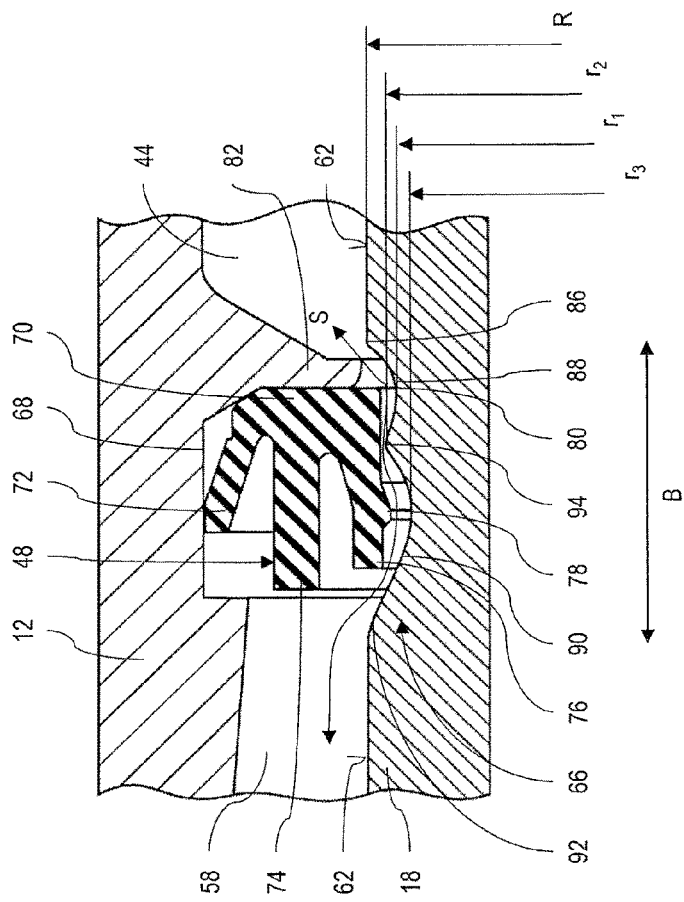
FIG. 2 shows the figure detail denoted by reference number II in FIG. 1, in an enlarged illustration.

Referring to FIG. 2, the enlarged figure detail II from FIG. 1 is apparent. In the illustration, the seal 48 is situated in a circumferential recess 68 present in the brake master cylinder housing 12. The seal 48 has a back 70 as well as a radially outwardly situated lip 72, a circumferential ring 74, and a radially inwardly situated lip 76 having a radially inwardly facing circumferential protrusion 78. In its radially inner area at the right in FIG. 2, the seal has a defined sealing edge 80. It is also apparent that in the area in which the seal back 70 is present, the cylinder housing 12 is provided with a circumferential radially inwardly facing protrusion 82 which separates the recess 68 from the fluid channel 44 to the fluid reservoir (not shown), with the exception of the area radially situated within the protrusion 82.

It is also apparent in FIG. 2 that in an axial region B, the secondary piston 18 is provided with profiling 66 on its outer circumferential surface 62. This profiling 84 spans the sealing element 48 in the starting position shown in FIG. 2, in which the secondary piston 18 has not yet been displaced by brake activation. In other words, the region B of the profiling 66 has a greater axial length than does the sealing element 48. It is apparent that the profiling 66, starting from an edge 86, has a first, radially inwardly extending rounded surface area section 88 and a second surface area section 90 adjoining same to the left in FIG. 2, which then merges in rounded form into a transition region 92 in the outer circumferential surface 62. A connecting area 94 is situated between the two surface area sections 88 and 90. Assuming that the outer circumferential surface 62 of the piston 18 is situated on a radial level R with respect to the piston longitudinal axis A (see FIG. 1), the lowest point of the surface area section 88 is situated on a radial level $r_1$, the highest point of the connecting area 94 is situated on a radial level $r_2$, and the lowest point of the surface area section 90 is situated on a radial level $r_3$. In the embodiment shown, the following expression applies for the radii r:

$$r_3 < r_1 < r_2 < R$$

All transitions, in particular in the region of the edge 86, of the surface area section 88, of the connecting area 94, of the surface area section 90, and of the transition region 92, have a rounded design, it being noted that the rounding radius is selected to be relatively small, in particular in the transition region 86.

It is further apparent in FIG. 2 that in the starting position there is no contact between the profiling 66 in region B of the outer circumferential surface 62 and the sealing element 48. In other words, a free fluid flow according to the double arrow S is possible between the channel 44, connected to the fluid reservoir, and the pressure chamber 58. This is necessary to ensure that even in a neutral position, brake fluid may be drawn out from the fluid reservoir into the fluid circuit of the motor vehicle brake system, for example when a traction control system activates individual components of the fluid circuit without action on the brake pedal by the driver, and for this purpose requires fluid from the fluid reservoir.

Figure 3:
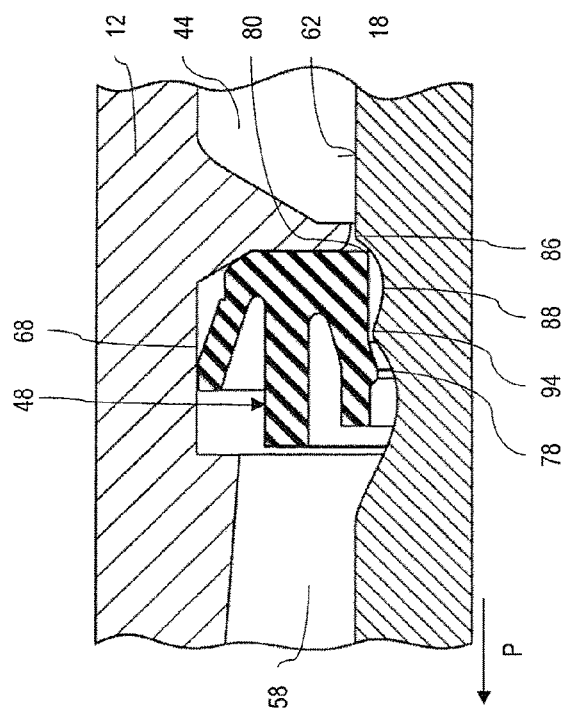
FIG. 3 shows the figure detail according to FIG. 2 in a state in which the pressure piston has already been displaced by brake activation.

If the pressure piston 18 is now displaced upon brake activation, the pressure piston moves from the starting position shown in FIG. 2 into a position shown in FIG. 3, corresponding to the arrow P. During the displacement from the position according to FIG. 2 into the position according to FIG. 3, there is still no contact between the sealing element 48 and the outer circumferential surface 62 together with its profiling 66. Nevertheless, the surface area section 88 approaching the sealing edge 80 as well as the radially outwardly facing connecting area 94 approaching the radially inwardly facing protrusion 78 of the sealing element 48 have a throttling effect on a pressurized fluid flow from the pressure chamber 58 into the pressure-free fluid channel 44. As a result of this throttling effect, fluid pressure having braking activity may be built up more quickly in the pressure chamber 48, since it counteracts a return flow of brake fluid from the pressure chamber 58 into the channel 44.

In the state shown in FIG. 3, contact between the sealing element 48 and the pressure piston 18 occurs for the first time. This contact occurs due to the edge 80 resting against the surface area section 88. Additionally or alternatively, the protrusion 78 may optionally rest against the connecting area 94. As soon as this contact is established, the pressure chamber 58 is completely sealed off from the channel 44 connected to the fluid reservoir. As a result, brake fluid can no longer flow back from the pressure chamber 58 into the channel 44 and into the fluid reservoir. The pressure chamber 58 is thus completely fluidically isolated from the channel 44 and the fluid reservoir. The increasing fluid pressure in the pressure chamber 58 also counteracts a displacement of the sealing element 48 in the recess 68 in the brake master cylinder housing 12.

Figure 8:
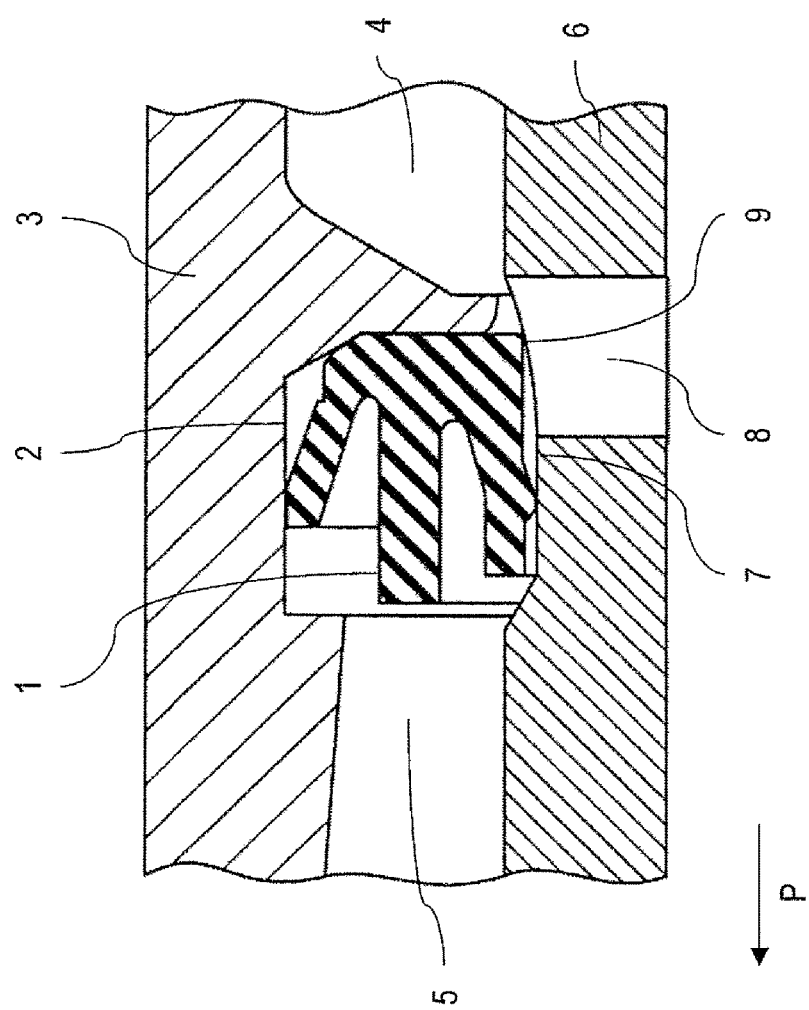
FIG. 8 shows an illustration for explaining the prior art.

The disadvantages of a displacement of the sealing element 48, described for the prior art with reference to FIG. 8, do not occur, or at best occur to a limited extent, in this embodiment of the invention. Starting from the state according to FIG. 3, if the pressure piston 18 is further displaced, the sealing element 48 slides with its edge 80 and the radially inwardly facing area onto the surface area section 88 and over the transition region 86, ultimately coming into full-surface sealing contact with the outer circumferential surface 62 of the pressure piston 18. Furthermore, the protrusion 78 provides an additional sealing effect.

With the invention it is thus possible to achieve a reliable fluidic connection between the fluid reservoir and the channel 44 connected thereto and the pressure chamber 58 in a starting position, while avoiding radial openings through the pressure piston 18, as are customary in the prior art. This meets the requirements in particular with regard to a possible fluid flow of brake fluid from the fluid reservoir into the fluid circuit. However, the invention also addresses the problem of the braking force building up in a delayed manner in conventional systems, in particular due to the requirement for radial openings and the displacement of the sealing element 48 which frequently results. According to the invention, this problem may be solved by providing suitable profiling 66 in region B of the outer circumferential surface 62 of the pressure piston 18.

A second embodiment of the invention is described below with reference to FIGS. 4 and 5. To avoid repetitions and to simplify the description, for components which are identical or have a similar function the same reference numerals are used as for the description of the first embodiment. The following discussion addresses only the differences from the first embodiment.

Figure 4:
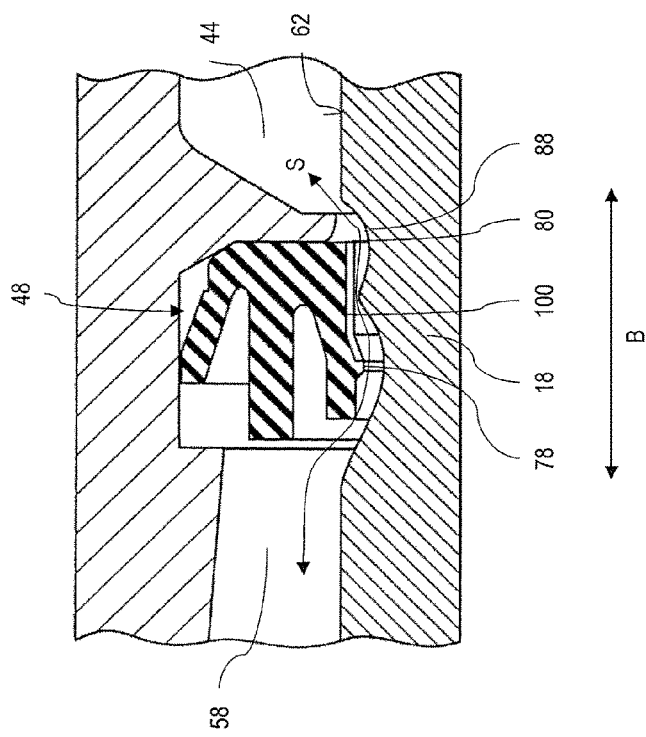
FIG. 4 shows the figure detail according to FIG. 2 of a second embodiment of the invention, in its starting position.

In FIG. 4, the secondary pressure piston 18 is in a starting position analogous to FIG. 2. However, in the area between the sealing edge 80 and the inwardly facing radial protrusion 78, a plurality of axial indentations 100 is now provided on the sealing element 48 on the side of the radially inwardly situated lip 76 facing the outer circumferential surface 62 of the pressure piston 18, the axial indentations being uniformly distributed at regular angular intervals over the inner periphery of the sealing element 48. The width of these axial indentations 100 in the peripheral direction of the secondary pressure piston 18 is several mm.

Figure 5:
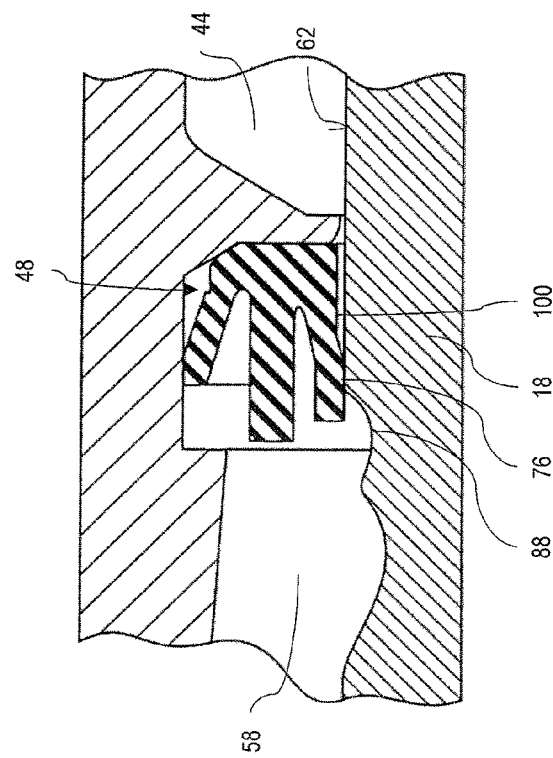
FIG. 5 shows the figure detail according to FIG. 4 of the second embodiment of the invention, but with a displacement of the pressure piston into a brake-activated position.

FIG. 5 shows the situation in which the secondary piston 18 is moved into a brake-activated position in which the secondary pressure chamber 58 is fluidically separated from the fluid channel 44 due to the radially inwardly situated lip 76 of the sealing element 48 resting against the outer circumferential surface 62. During a return stroke from the brake-activated position according to FIG. 5 into the starting position according to FIG. 4, the axial indentations 100 now assist with a fluidic connection of the pressure chamber 58 to the fluid channel 44. In particular when there is a residual pressure in the brake system, for example due to a superimposition of the actuation of a traction control system and of a brake activation, during a return stroke, possibly also in a position of the secondary pressure piston 18 which would allow a fluidic connection under normal circumstances, the radially inwardly situated lip 76 is pressed tightly against the outer circumferential surface of the secondary pressure piston 18 by means of the residual pressure prevailing in the pressure chamber. This applies in particular when the radially inwardly situated lip 76 makes tight contact within the first surface area section 88. However, the axial indentations 100 are largely unaffected by such deformation under residual pressure, and maintain their shape. During a return stroke into the starting position, the axial indentations now assist in the formation of a fluidic connection between the pressure chamber 58 and the fluid channel 44. Namely, the axial indentations are opened up during a return stroke, even under residual pressure, due to the first surface area section 88 which slopes downwardly in the radial direction, and thus assist the return of the brake fluid from the pressure chamber 58, even when the radial inwardly situated lip 76 rests tightly against the pressure piston 18 due to the residual pressure. In the description above, the fluidic connection is established only when the sealing element 48 is completely opened up. Thus, the pressure build-up in the fluid circuit is accelerated, and friction forces acting on the sealing element 48 during the return stroke are reduced, even in the case of prevailing residual pressure.

In addition, a third embodiment of the invention is described below with reference to FIGS. 6 and 7. To avoid repetitions and to simplify the description, for components which are identical or have a similar function the same reference numerals are used as for the description of the first embodiment. The following discussion addresses only the differences from the first and second embodiments.

Figure 6:
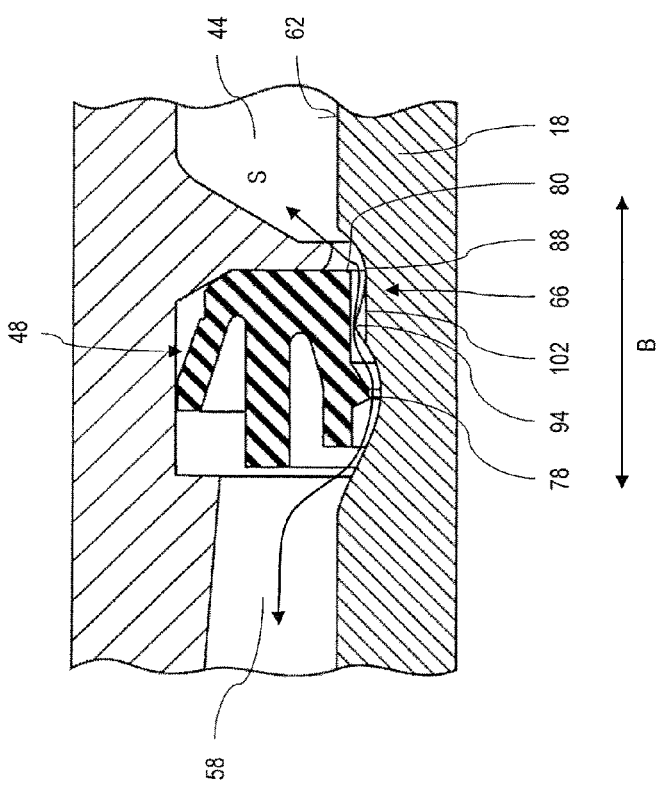
FIG. 6 shows the figure detail according to FIG. 2 of a third embodiment of the invention, in its starting position.

In FIG. 6, the secondary pressure piston 18 is in a starting position analogous to FIG. 2. However, the profiling 66 of the pressure piston 18 is now provided with a plurality of axial indentations 102 in the connecting area 94 of the outer circumferential surface 62, the axial indentations being uniformly distributed over the inner periphery of the pressure piston 18. The width of these axial indentations 102 in the peripheral direction of the secondary pressure piston 18 may once again be small, up to several mm.

Figure 7:
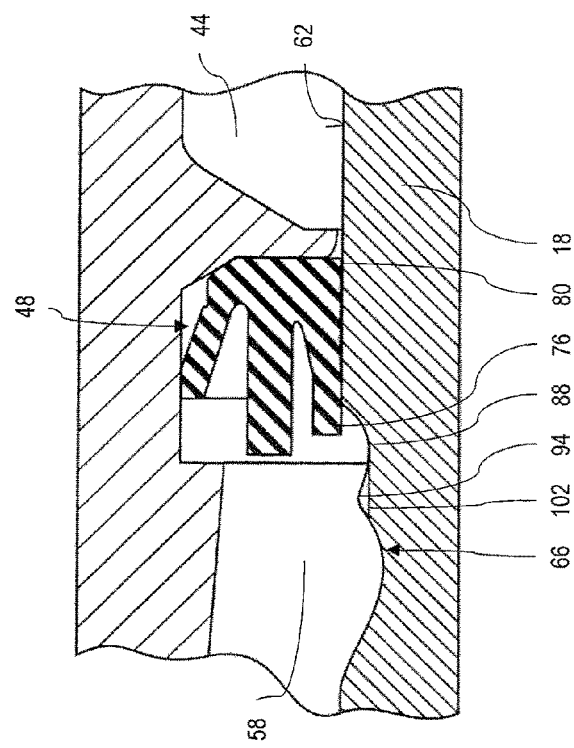
FIG. 7 shows the figure detail according to FIG. 4 of the second embodiment of the invention, but with a displacement of the pressure piston into a brake-activated position.

This is likewise relevant during a return stroke from a brake-activated position according to FIG. 7. Similarly as for the description with reference to FIG. 5, it is conceivable, in particular when a residual pressure prevails, for the radially inwardly situated lip 76 and in particular the radially inwardly facing protrusion 78 to be pressed tightly against the outer circumferential surface 62. This applies in particular in the connecting area 94. In a design according to FIGS. 2 and 3, in such a case a fluidic connection from the pressure chamber 58 to the region of the first surface area section 88 is possible only when the connecting area 94 has been completely overrun by the radially inwardly facing protrusion 78. Due to the axial indentations 102, this already occurs when the inwardly facing lip 76 of the sealing element 48 has overrun the lowest point of the first surface area section 88 (see r₂ in FIG. 2) and runs up against the connecting area 94. Accordingly, the formation of a fluidic connection from the pressure chamber 58 to the fluid channel 44 depends only on when the sealing edge 80 is opened up by the outer circumferential surface 62. When the arrangement comprising the sealing element 48 and the profiling 66 is appropriately dimensioned, the pressure build-up in the fluid circuit may thus be accelerated, and the friction forces acting on the sealing element 48 may be reduced compared to the design according to FIGS. 2 and 3, even in the case of prevailing residual pressure.

Of course, it is also conceivable for the embodiments illustrated in FIGS. 4 and 5 and FIGS. 6 and 7 to be implemented in combined form.

The invention claimed is:

1. A main brake cylinder arrangement for a vehicle brake system, comprising:
   a main brake cylinder housing having a cylindrical recess,
   at least one pressure piston which is movably and sealingly guided in the cylindrical recess of the main brake cylinder housing along a longitudinal axis, and
   a fluid reservoir for storing a brake fluid, the fluid reservoir being fluidically coupled to the main brake cylinder housing via a fluid channel, wherein
   the at least one pressure piston, together with the main brake cylinder housing, encloses a pressure chamber in a sealing manner, which pressure chamber is or can be fluidically coupled to a fluid circuit of the motor vehicle brake system, and, depending on the position of the associated pressure piston, is fluidically coupled to the fluid reservoir or disconnected therefrom,
   a sealing arrangement enclosing the pressure piston is provided between the outer circumferential surface of the pressure piston and the cylindrical recess in the main brake cylinder housing,
   in an axial region that spans the sealing arrangement in the axial direction in a starting position of the pressure piston, the outer circumferential surface of the pressure piston is furnished with profiling that provides a fluidic connection between the fluid reservoir and the pressure chamber,
   the profiling is furnished with surface area sections which are situated at different radial levels with respect to the longitudinal axis, and
   at least one axial indentation is provided in the sealing arrangement and/or in the area of the profiling of the pressure piston which enables an assisting fluidic connection between the fluid reservoir and the pressure chamber;
   wherein the profiling has a first surface area section and a second surface area section, the first surface area section being situated at a higher radial level with respect to the longitudinal axis than the second surface area section; and
   wherein the first and the second surface area sections are connected to one another via a connecting area that is radially recessed with respect to the outer circumferential surface of the pressure piston and is situated at a higher radial level than the respective radially innermost point of the first surface area section and of the second surface area section.

2. The brake master cylinder arrangement defined in claim 1 wherein the profiling has a radial recess in the outer circumferential surface of the pressure piston.

3. The brake master cylinder arrangement defined in claim 1 wherein the profiling is provided only in partial areas of the outer circumferential surface of the pressure piston or extends in the axial region around the pressure piston in the peripheral direction.

4. The brake master cylinder arrangement defined in claim 1 wherein the profiling opens up the sealing arrangement in the starting position until the fluid reservoir is fluidically decoupled so that the pressure piston does not contact the sealing arrangement.

5. The brake master cylinder arrangement defined in claim 1 wherein the profiling has a design with a rounded contour when viewed in a cross section of the pressure piston containing the axis.

6. The brake master cylinder arrangement defined in claim 5 wherein the transition between the outer circumferential surface of the pressure piston and the profiling, has a rounded design.

7. The brake master cylinder arrangement defined in claim 5 wherein the transition between a first surface area section and a second surface area section of the profiling has a rounded design.

8. The brake master cylinder arrangement defined in claim 1 wherein the profiling throttles the fluid flow between the pressure chamber and the fluid reservoir when the pressure piston moves from the starting position into a brake-activated position.

9. The brake master cylinder arrangement defined in claim 1 wherein in the starting position of the pressure piston, the profiling together with the sealing arrangement forms a flow cross section whose cross-sectional area decreases with increasing displacement of the pressure piston from the neutral position into a brake-activated position.

10. The brake master cylinder arrangement defined in claim 1 wherein the axial indentation is provided in the connecting area of the pressure piston.

* * * * *